(12) United States Patent
Zapata Abdala et al.

(10) Patent No.: US 10,000,241 B2
(45) Date of Patent: Jun. 19, 2018

(54) ROCKER REINFORCEMENT BRACKET HAVING ANTI-CORROSION HOLES

(71) Applicant: FORD GLOBAL TECHNOLOGIES, LLC, Dearborn, MI (US)

(72) Inventors: Ohster Edga Zapata Abdala, Mexico City (MX); Rezaul Choudhury, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/054,800

(22) Filed: Feb. 26, 2016

(65) Prior Publication Data

US 2017/0247059 A1     Aug. 31, 2017

(51) Int. Cl.
*B62D 25/02*     (2006.01)
*B62D 25/20*     (2006.01)

(52) U.S. Cl.
CPC ......... *B62D 25/02* (2013.01); *B62D 25/2036* (2013.01)

(58) Field of Classification Search
CPC ............................ B62D 25/02; B62D 25/2036
USPC ..................................... 296/209, 208, 29, 30
See application file for complete search history.

(56) References Cited

U.S. PATENT DOCUMENTS

| | | | | |
|---|---|---|---|---|
| 5,755,486 A | * | 5/1998 | Wycech | B29C 70/66 296/187.02 |
| 5,884,960 A | * | 3/1999 | Wycech | B29C 44/1228 296/146.6 |
| 6,199,940 B1 | * | 3/2001 | Hopton | B60J 5/0447 296/146.6 |
| 6,253,524 B1 | * | 7/2001 | Hopton | B29C 44/128 296/187.02 |
| 6,305,136 B1 | * | 10/2001 | Hopton | B29C 44/18 296/146.6 |
| 6,419,305 B1 | | 7/2002 | Larsen | |
| 6,561,571 B1 | | 5/2003 | Brennecke | |
| 2004/0255546 A1 | * | 12/2004 | Sophiea | B62D 29/002 52/745.19 |
| 2005/0238814 A1 | | 10/2005 | Renken | |
| 2006/0036012 A1 | | 2/2006 | Hayes et al. | |
| 2014/0159421 A1 | * | 6/2014 | Schneider | B62D 29/002 296/187.02 |
| 2015/0166136 A1 | | 6/2015 | Richardson et al. | |

FOREIGN PATENT DOCUMENTS

WO     03042024 A1     5/2003

\* cited by examiner

*Primary Examiner* — Jason S Morrow
*Assistant Examiner* — E Turner Hicks
(74) *Attorney, Agent, or Firm* — Jason C. Rogers; Brooks Kushman P.C.

(57) ABSTRACT

A bracket for a rocker panel assembly includes a first flange and a second flange. The second flange is at an end of a body opposite the first flange and extends parallel to the first flange. The first and second flanges each define a plurality of apertures being dimensioned and configured to control flow of an E-coat fluid injected therein to provide a seal between the first and second flanges to inhibit oxidation in an absence of a seal around a periphery of the first and second flanges.

17 Claims, 2 Drawing Sheets

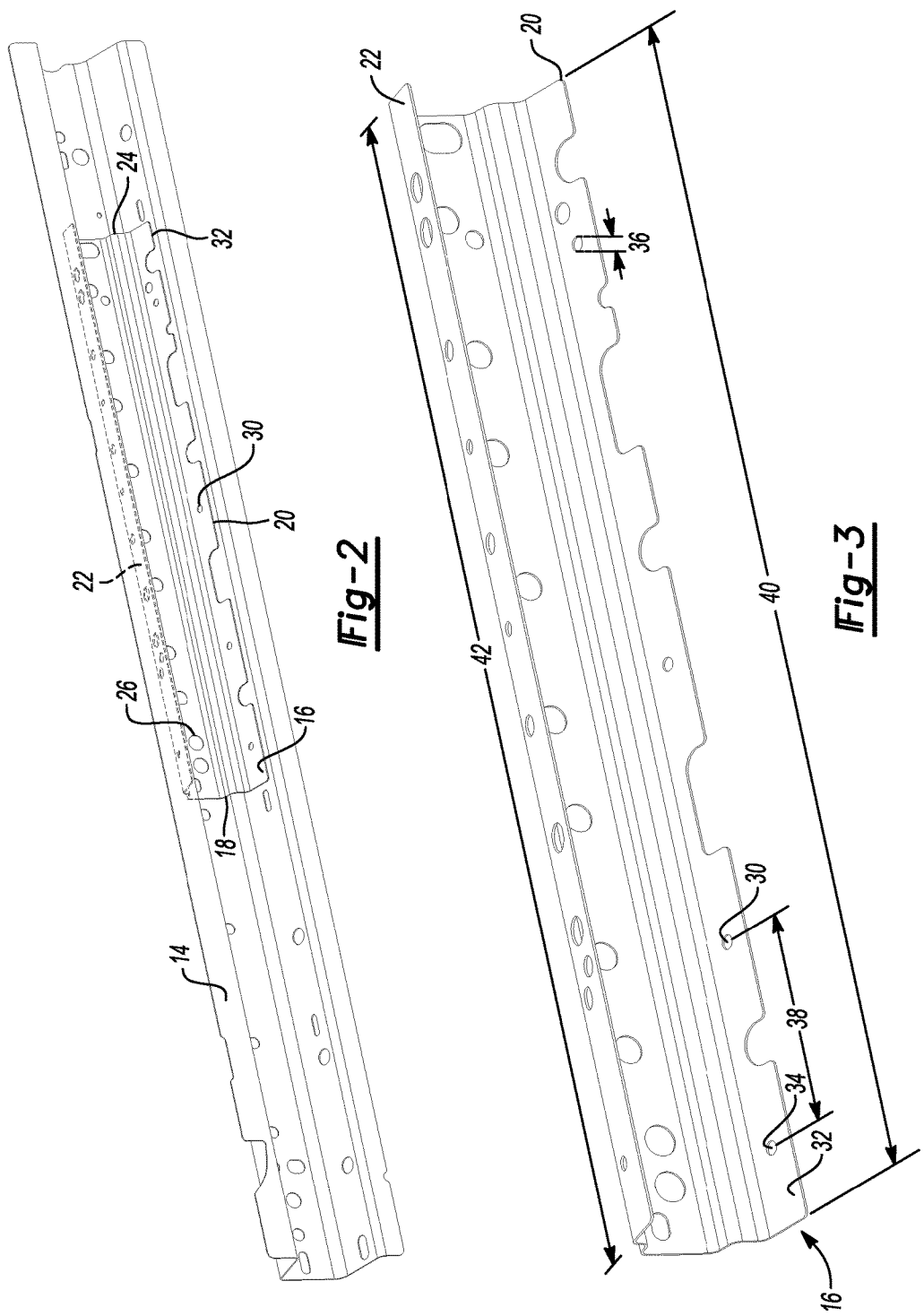

ROCKER REINFORCEMENT BRACKET HAVING ANTI-CORROSION HOLES

TECHNICAL FIELD

The present disclosure relates to reinforcement brackets on vehicle rocker assemblies.

BACKGROUND

Vehicle rocker panels interconnect structural members of the vehicle. The rocker panel may be formed with a contour. The contour of the rocker panel may require reinforcement to prevent deformation of the rocker panel. Reinforcement brackets are oftentimes attached inside the rocker panel to add structural rigidity to the rocker panel and strengthen the vehicle. The reinforcement brackets help to prevent deformation of the rocker panel by attaching to the rocker panel. Therefore, the reinforcement brackets are designed to integrate with the contour of the rocker panel in order to increase the stiffness of the rocker panel.

SUMMARY

A vehicle rocker panel assembly includes a steel rocker panel and a steel bracket. The steel bracket is attached to the panel at a flange to reinforce the panel. The flange defines apertures each having a diameter configured to permit release of pressure caused by injection of E-coat fluid into the apertures and between the panel and flange to inhibit oxidation therebetween in an absence of a seal around a periphery of the flange.

A vehicle includes a rocker panel assembly. The rocker panel assembly includes a steel rocker panel, and a bracket. The bracket extends a length of the rocker panel and defines a plurality of spaced apart apertures on a flange of the bracket parallel to the rocker panel. The apertures being dimensioned so as to direct flow of an E-coat liquid injected therein between the flange of the bracket and rocker panel to inhibit oxidation therebetween in an absence of a seal around a periphery of the flange, and to relieve a pressure between the flange and rocker panel associated with the flow.

A bracket for a rocker panel assembly includes a first flange and a second flange. The second flange is at an end of a body opposite the first flange and extends parallel to the first flange. The first and second flanges each define a plurality of apertures being dimensioned and configured to control flow of an E-coat fluid injected therein to provide a seal between the first and second flanges to inhibit oxidation in an absence of a seal around a periphery of the first and second flanges.

BRIEF DESCRIPTION OF THE DRAWINGS

FIG. 2 is a perspective view of the reinforcement bracket attached to the rocker assembly for a vehicle; and FIG. 3 is a perspective view of the reinforcement bracket with defined anti-corrosion holes.

DETAILED DESCRIPTION

Figure 1:
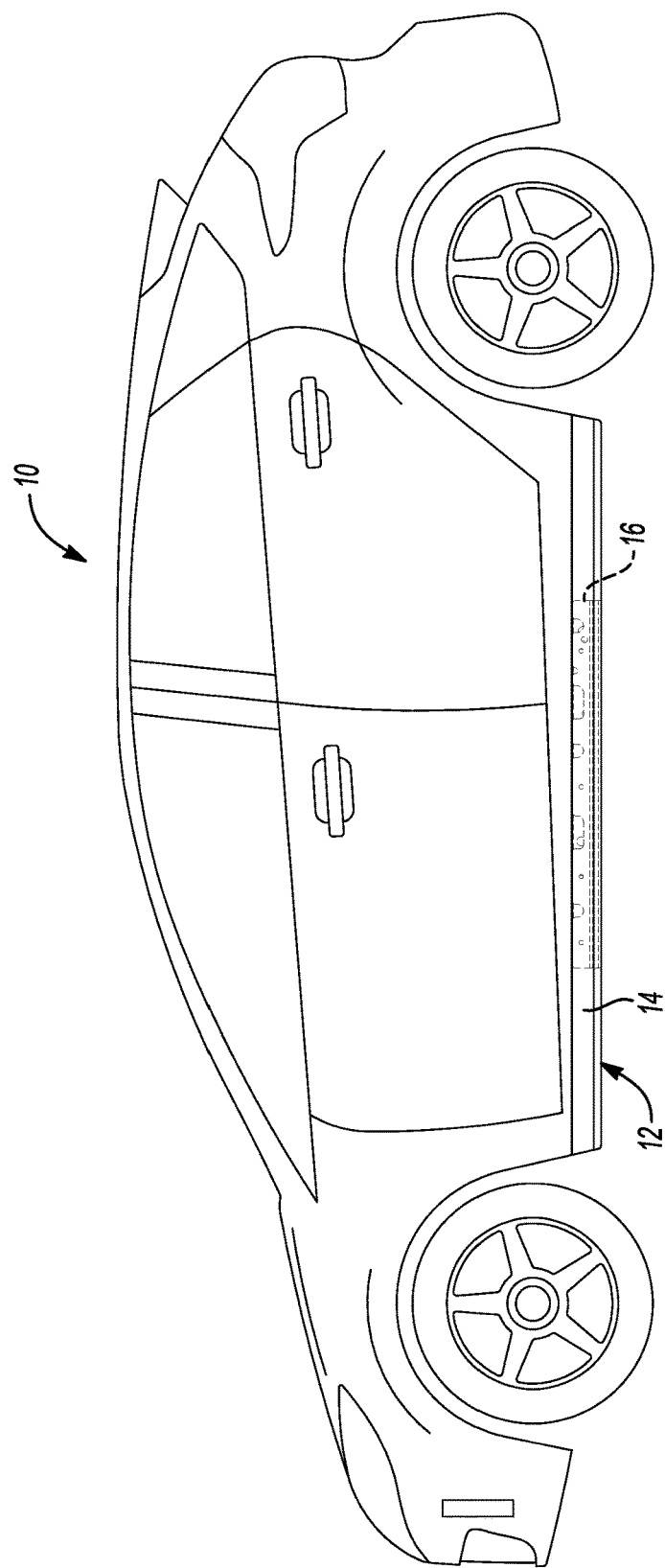
FIG. 1 is a side view of a vehicle having a rocker panel reinforcement bracket.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 depicts a side view of a vehicle 10 having a rocker panel assembly 12. The rocker panel assembly 12 includes a rocker panel 14 and the reinforcement bracket 16. The rocker panels may be formed of thin martensitic layers. Reinforcement brackets may be attached to the rocker panels to prevent the rocker panels from deforming. The reinforcement brackets may also be formed from steel. Without a sealant or corrosion resistant layer, attachment between the reinforcement brackets and the rocker panels may create a galvanic reaction resulting in corrosion.

As will be discussed in detail with reference to the other Figures, typically an E-coat sealant is provided between the rocker panel 14 and the reinforcement bracket 16. The E-coat sealant acts as a barrier between the rocker panel 14 and the reinforcement bracket 16 to prevent corrosion through galvanic reaction. Further, the E-coat sealant may also prevent liquid such as water to gather between the rocker panel 14 and the reinforcement bracket 16. By sealing any gap between the rocker panel 14 and the reinforcement bracket 16, the E-coat sealant also aids to prevent corrosion through the introduction of corrosive solvents between the rocker panel 14 and the reinforcement bracket 16.

Adding the reinforcement bracket 16 to the rocker panel 14 strengthens the overall structural rigidity of the rocker panel assembly 12. Adding the E-coat sealant between the rocker panel 14 and the reinforcement bracket 16 further aids to prevent corrosion of the rocker panel assembly 12. Therefore, attaching the reinforcement bracket 16 to the rocker panel assembly 12 prevents the rocker panel assembly 12 from deforming when a force is applied, as well as preventing corrosive rust from eating away at the rocker panel assembly 12.

FIG. 2 depicts a perspective view of the reinforcement bracket 16 attached to the rocker panel 14. The reinforcement bracket 16 has a contour 18 to allow for attachment to the rocker panel 14. The reinforcement bracket 16 uses first and second flanges 20, 22 to provide support to the rocker panel 14 in at least two locations. Attaching the reinforcement bracket 16 to the rocker panel 14 using two attachment points increases the stiffness of the rocker panel 14. The first and second flanges 20, 22 are interconnected by a body 24. The body 24 is designed to allow the first flange 20 and the second flange 22 to provide flat contact between the reinforcement bracket 16 and the rocker panel 14. The first and second flanges 20, 22 connect to the body at a substantially right angle. Being substantially perpendicular to the body 24 allows the reinforcement bracket 16 to provide structural rigidity to the rocker panel preventing deformation to the rocker panel assembly 12.

In order to provide structural rigidity to the rocker panel assembly 12, the first flange 20 and the second flange 22 as well as the body 24 need to maintain stiffness. Therefore, access holes 26 need to be designed such that they do not weaken the first flange 20, the second flange 22, or the body 24. Further, the first flange 20 and the second flange 22 require the E-coat to prevent corrosion at the attachment between the rocker panel 14, the first flange 20 and the second flange 22. A plurality of apertures 30 may be defined on the first flange 20 and the second flange 22 to allow E-coat to flow between the rocker panel 14, the first flange 20 and the second flange 22. The plurality of apertures 30 are designed such that the reinforcement bracket 16 provides structural rigidity to the rocker panel 14.

The plurality of apertures 30 are configured to direct the flow of the E-coat sealant by pumping excess air from between the first and second flanges 20, 22 and the rocker panel 14. For example, injecting E-coat sealant through the apertures 30 applies pressure between the first and second flanges 20, 22 and the rocker panel 14 forcing air to escape via the apertures 30. As the E-coat is injected and covers a contact area 32 between the first flange 20 and the second flange 22 and the rocker panel 14, air is released into the atmosphere through the plurality of apertures 30. Releasing air in the atmosphere aids to prevent corrosion by inhibiting oxide from forming at the junction of the first and second flanges 20, 22 and the rocker panel 14. Further, by sealing the contact areas 32 between the apertures 30, the E-coat prevents corrosion due to rust.

The plurality of apertures 30 prevents the need for a seal around the outer perimeter of the first flange 20 and the second flange 22. The plurality of apertures 30 allows injection of E-coat to contact areas 32 between the reinforcement bracket 16 and the rocker panel 14. By providing a mechanism for which the E-coat can provide sealing and corrosion resistance, the plurality of apertures 30 saves cost because the reinforcement bracket 16 can provide corrosion resistance and reinforce structural rigidity of the rocker panel 14. Therefore, the reinforcement bracket 16 via the plurality of apertures 30 disposed along the first and second flanges 20, 22 provides reinforced structure to the rocker panel 14 and inhibits oxide formation in the absence of a seal around the periphery of the first flange 20 and the second flange 22.

FIG. 3 depicts a perspective view of the reinforcement bracket 16. As described above, the number of the plurality of apertures 30 on both the first flange 20 and the second flange 22 needs to be optimized in order to allow the reinforcement bracket 16 to maintain structural rigidity of the rocker panel. Likewise, the dimensions of the apertures 30 also need to be optimized in order to maintain the structural rigidity of the reinforcement bracket 16 and as such the rocker panel. For example, the orientation of the plurality of apertures 30 on the first and second flanges 20, 22 provides flow of E-coat as well as a rigid reinforcement.

The plurality of apertures 30 may each define a center 34 and a diameter 36. The location of each aperture 30 is both based on the distance 38 between the centers 34 of the apertures 30 as well as the diameter 36 of the apertures 30. For example, in at least in one embodiment, the first flange 20 may define four apertures 30 across a length 40 of the first flange. Likewise, in at least one embodiment, the second flange 22 may define three apertures across a length 42 of the second flange 22. Using this orientation, the apertures may have a diameter 36 not exceeding 10 mm. Further, to ensure coverage of the E-coat sealant underneath the contact areas 32 of the bracket 16, the apertures 30 are placed with each center 34 approximately between 15 and 20 mm. While shown and described using a single orientation, other orientations and dimensions of the apertures 30 may be contemplated that allow the reinforcement bracket 16 to reinforce the rocker panel as well as to prevent corrosion between the contact areas 32 of the reinforcement bracket and the rocker panel.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle rocker panel assembly comprising:
a steel rocker panel; and
a steel bracket attached to the panel at a flange to reinforce the panel, the flange defining apertures each having a diameter configured to permit release of pressure caused by injection of E-coat fluid into the apertures and between the panel and flange to inhibit oxidation therebetween in an absence of a seal around a periphery of the flange.

2. The rocker panel assembly of claim 1, wherein the diameter of the apertures is between 8-10 millimeters.

3. The rocker panel assembly of claim 1, wherein the flange has a length such that four apertures are defined thereacross.

4. The rocker panel assembly of claim 1, wherein the apertures are further configured to direct flow of the E-coat fluid between the panel and flange.

5. The rocker panel assembly of claim 1, wherein the bracket defines a substantial L-shape having a second flange extending perpendicularly from the flange.

6. The rocker panel assembly of claim 5, wherein the second flange includes a ledge extending perpendicular to the second flange and parallel to the flange.

7. The rocker panel assembly of claim 6, wherein the ledge defines other apertures having substantially similar dimensions as the apertures defined on the flange.

8. A vehicle comprising:
a rocker panel assembly including
a steel rocker panel, and
a bracket extending a length of the rocker panel and defining a plurality of spaced apart apertures, on a flange of the bracket parallel to the rocker panel, dimensioned so as to direct flow of an E-coat liquid injected therein between the flange of the bracket and rocker panel to inhibit oxidation therebetween in an absence of a seal around a periphery of the flange, and to relieve a pressure between the flange and rocker panel associated with the flow.

9. The vehicle of claim 8, wherein the bracket defines a substantial L-shape having a second flange extending perpendicularly from the flange.

10. The vehicle of claim 9, wherein the second flange includes a ledge extending perpendicular to the second flange and parallel to the flange.

11. The vehicle of claim 10, wherein the ledge defines other apertures having substantially similar dimensions as the apertures defined on the flange.

12. The vehicle of claim 11, wherein the other apertures are spaced apart along a length of the ledge.

13. The vehicle of claim 11, wherein the apertures are spaced apart along a length of the flange.

14. A bracket for a rocker panel assembly comprising:
a first flange; and
a second flange at an end of a body opposite the first flange and extending parallel to the first flange, wherein the first and second flanges each define a plurality of apertures being dimensioned and configured to control flow of an E-coat fluid injected therein to provide a seal between the first and second flanges to inhibit oxidation in an absence of a seal around a periphery of the first and second flanges.

15. The bracket of claim 14, wherein a diameter of the apertures is between 8-10 millimeters.

16. The bracket of claim 14, wherein the first flange has a length such that four apertures are defined thereacross and the second flange has a length such that three apertures are defined thereacross.

17. The bracket of claim 14, wherein the apertures are further configured to release pressure associated with the flow of the E-coat fluid.

* * * * *